US009009709B2

(12) United States Patent
Long et al.

(10) Patent No.: US 9,009,709 B2
(45) Date of Patent: Apr. 14, 2015

(54) ASYNCHRONOUS ROLLUP NUMBERS FORECASTING METHODS AND SYSTEMS

(75) Inventors: Martin Long, Alameda, CA (US); Chien-Lang Chou, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 1031 days.

(21) Appl. No.: 13/049,596

(22) Filed: Mar. 16, 2011

(65) Prior Publication Data

US 2011/0231848 A1 Sep. 22, 2011

Related U.S. Application Data

(60) Provisional application No. 61/314,284, filed on Mar. 16, 2010.

(51) Int. Cl.
G06F 9/46 (2006.01)
G06F 9/54 (2006.01)
G06F 17/30 (2006.01)

(52) U.S. Cl.
CPC .......... G06F 9/546 (2013.01); G06F 17/30289 (2013.01); G06F 17/30407 (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |

(Continued)

OTHER PUBLICATIONS

"Google Plus Users", Google+Ripples, Oct. 31, 2011 [retrieved on Feb. 21, 2012 from Internet], 3 pages.

*Primary Examiner* — Eric C Wai
(74) *Attorney, Agent, or Firm* — Weaver Austin Villeneuve & Sampson LLP

(57) ABSTRACT

Improved methods and systems are provided for asynchronously updating forecast rollup numbers. The asynchronousity is achieved by decoupling the source data change from further manipulations of the source data, for example in calculating and updating forecast rollup numbers by user role hierarchy, layer by layer. An event message queue implementation can be used for asynchronous processing. The process works by dequeuing a batch of event messages and then deduping and sorting them before applying forecast logic. Forecast numbers are updated based on target data and then rolled up the user role levels by aggregating forecast numbers for all subordinate forecast data entries.

17 Claims, 9 Drawing Sheets

(56) References Cited

U.S. PATENT DOCUMENTS

| | | | |
|---|---|---|---|
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,479 B2 * | 6/2006 | Edmunds et al. ............ 707/603 |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,421 B2 * | 8/2010 | Kasravi et al. ................ 719/318 |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2012/0233137 A1 | 9/2012 | Jakobson et al. |
| 2012/0290407 A1 | 11/2012 | Hubbard et al. |
| 2013/0218948 A1 | 8/2013 | Jakobson |
| 2013/0218949 A1 | 8/2013 | Jakobson |
| 2013/0218966 A1 | 8/2013 | Jakobson |

\* cited by examiner

ASYNCHRONOUS ROLLUP NUMBERS FORECASTING METHODS AND SYSTEMS

CROSS-REFERENCES TO RELATED APPLICATIONS

This application claims benefit of priority to U.S. Provisional Application 61/314,284, filed Mar. 16, 2010, commonly assigned, which is incorporated in its entirety by reference for all purpose.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to sharing and accessing data, and more particularly to providing forecasts using data in an on-demand database and/or application service.

Management teams of organizations require reporting on many facets of their business in order to make informed decisions (e.g. Manager of a sales team requires opportunity numbers to forecast revenue). Reporting systems provide capabilities for a user to submit a request to create a report. As an example, a manager submits a request to generate a report for forecast numbers of his sales team. The system then creates a report based on the supplied parameters and requested output data. This is known as a normalized model. Such systems have the inherent characteristic of a user having to wait while the report is being generated, sometimes for substantial periods of time. The wait period problem can be further aggravated in multi-tenant database systems (MTS) where a large number of users access the database at any given time, sometimes applying complex logic with high granularity dimension data (e.g. totals for a large team of sales personnel) and user overrides (e.g. manager estimates for sales data).

Other systems might provide reporting type of data such as forecast numbers in real-time. A truly real-time implementation requires that the aggregation of forecast rollups occur in a single database transaction upon changes to the source data (e.g. a sales person changes opportunity data). Although this may alleviate the wait period problem of the normalized model, it can introduce a system resource problem, particularly locking contention in databases. Other users of the system may have to wait for system resources to free up while numbers are aggregated and updated for forecasts in a single transaction. The resource contention problem can be further aggravated in a MTS system where large number of users access the database system at any given time and are contending for system resources simultaneously.

It is therefore desirable to provide asynchronous systems and methods for reporting type of data (e.g. forecast rollups) where the forecast numbers are updated neither on demand as in a normalized model nor in a single transaction with every source data update as in a truly real-time model. Such a system facilitates more scalable, powerful and flexible systems.

BRIEF SUMMARY OF THE INVENTION

The present invention relates generally to sharing and accessing data, and more particularly to providing forecasts using data in an on-demand database and/or application service.

In certain embodiments, methods and systems for generating forecasts are provided. A forecast is, for example, the aggregation of a numeric value of the source data (e.g. a sales person's revenue number from his opportunity data), that is then aggregated up a user role hierarchy, layer by layer as a rollup along dimensions. Measures are quantitative attributes that are aggregated to create forecast totals (e.g. revenue or quantity). Dimensions are qualitative attributes that are used to qualify and slice forecast numbers (e.g. aggregated revenue for a sales person over one or more dimensions such as: a period of time, a product, a region, etc.).

A forecast is based on a multi-dimensional analysis of source data (e.g. containing a numeric value—typically data from objects such as opportunities, opportunity products, or opportunity schedules). Most of the source data's dimensions are typically small, and their rollup logic is simple (e.g. periods). As a result, rollup can be performed on demand like a report when the forecast is viewed (e.g. aggregating months into quarters). The user/role dimension is often different however; it is typically large, and its rollup logic is complex (e.g. a user can override a subordinate's forecast). As such, it is often impractically slow to aggregate when the forecast is viewed. Instead, in one embodiment, the source data is aggregated up the user/role dimension and stored when the source data changes.

In other embodiments, asynchronous methods and systems for generating forecasts rollups are provided. When a user changes source data (e.g. updates an opportunity), it is desirable to synchronize those changes to the target data (e.g. fact table data) and forecast rollup numbers asynchronously. Doing this asynchronously advantageously allows complex data transformations on the target data (e.g. rollups, summarizations, conversions) to be performed at a time of choosing when suitable system resources are available, rather than holding up the user's change to wait for those resources to become available. This avoids contention.

In one embodiment, improved methods and systems are provided for asynchronously updating forecast rollup numbers, making them available for viewing in near real-time. The asynchronousity is achieved by decoupling the source data change (e.g. a sales person updates her opportunity data) from further manipulations of the source data. One example of further manipulations is updates to target data (e.g. a copy of the source data, having a one-to-one relationship with the source data, maintained separately to decouple front-end users updating opportunity data from back-end processing that will use that source opportunity data for forecast rollups). Another example is the updating of the forecast rollup numbers themselves.

The asynchronous processing can be done in a single transaction or multiple transactions. It can be order independent, messages can be processed differently from the order in which the underlying event occurred. Also, such an implementation allows for bulk processing of messages taking into account system resources.

In certain aspects, the asynchronous system uses a message queue implementation, such as an event message queue. When a user changes source data or forecast override data, the system adds one or more event messages to a queue for later, e.g., forecast rollup processing by an asynchronous process. The asynchronous process dequeues a batch of event messages and processes the batch of events to update forecast rollup numbers. The updated forecast rollup numbers can be displayed on a monitor or other output device.

In one embodiment, the batch is processed by processing the events one by one. Upon the processing of an event, its associated source, target and forecast data is retrieved. Once the data is retrieved, the delta between the source and target is computed (e.g. the difference in the opportunity value such as $10,000 is changed to $20,000—resulting in a delta computation of plus $10,000). The target data is updated with the source data and the delta is applied to forecast data (e.g. the sales person who modified the opportunity will have his forecast number increased by $10,000). The forecast data is then rolled up by user role layer by layer (e.g. the $10,000 increase in opportunity data is added to the sales person's immediate manager, and rolled up to the territorial manager and then to the CEO of the company).

According to certain aspects, forecast numbers are calculated or aggregated layer by layer, and entity and dimension worlds are decoupled. This allows for small, simple queries instead of giant queries, and it avoids a lot of intermediate tables and reduces data inconsistency risks. Additionally, far fewer resources are used, direct reports' numbers are reused layer by layer (sorting by user role layer) instead of scanning the whole sub-tree for each forecast, events are processed together while rolling up the hierarchy, e.g. for a thousand sales rep changes, the top (e.g., CEO) is updated only once (event deduping).

In one embodiment, the batch processing is implemented and made more efficient by first deduping the events, then sorting the events by event type, then sorting the events by user role layer, after which the remaining events are processed. The deduping step removes any duplicate events (e.g. if there are three forecast rollup events for a manager VP1, two of them will be removed leaving only one forecast rollup event for VP1). The sorting by event type results in for example, three categories of events: entity event, override event, and rollup event. And the sorting by user role level for example can result in categories of events for User1, his manger VP1, and the head of the company CEO.

In certain aspects, there are at least three different event types: entity change event, override event, and rollup event. An entity change event is created for example when a user updates base level data or source data (e.g. a sales person updates his opportunity data). In one embodiment, the entity change event will contain information that identifies the source data object and the impacted forecast data object.

An override event is created, for example, when a user updates forecast override data. In one embodiment, the associated event will contain the identifier for the override and/or the impacted forecast data object. And the rollup event, for example, specifies that an aggregation for a forecast number at a particular user or user role level is required (e.g. a rollup for manager VP1 needs to be performed). In one embodiment, the rollup event will contain information identifying which forecast data needs to be aggregated or rolled up.

In one embodiment, the processing of events in the batch processing step is done by first processing all entity type events, one at a time. Then, all override events are processed one at a time. After which, the rollup events are processed, one at a time, user role layer-by-layer (e.g. first process rollup event for manager VP1, then process rollup event for the CEO).

In one embodiment, an event is processed one at a time by obtaining a lock on forecast data based on the event being processed, obtaining a lock on target data based on the event being processed; re-queuing the event being processed where a lock could not be obtained, otherwise updating target data and forecast data; and adding a rollup event to the event queue where a user role layer above the current processing layer exists and where the event is not a duplicate of another event in the batch being processed.

For example, when an event representing User1's update to his opportunity data from $10,000 to $20,000 is being processed, an attempt is made to obtain a lock on the corresponding forecast data object for that user (e.g. a lock for User1's forecast row in the forecast table). If that is successful an attempt is made to obtain a lock on the corresponding target or fact data object (e.g. a lock for User1's row in the fact table corresponding to the opportunity that is updated). If either lock is not obtained then the event is re-enqueued otherwise processing of forecast rollups continues.

In certain aspects, the asynchronous system is implemented by distinguishing between two different kinds of attributes on the source data: dimensions and measures. Dimensions are qualitative attributes (e.g. period of time, sales person, product, region, etc.) used to slice report data such as forecast numbers. Measures are quantitative attributes used to aggregate for example forecast totals (e.g. revenue or quantity).

In one embodiment, when a user alters source data the dimensions are compared for source data and target data. If they are the same (e.g. the user has changed only source measure data such as revenue), one message is pushed on the queue containing the dimension data (note no measure data information is required). If on the other hand they differ (e.g. the user has altered source dimension data) two messages are pushed on the queue, the first having the target's dimensions and the second having the source's dimensions (note once again no measure data information is required on either message).

In one embodiment, an event message is retrieved from a message queue for processing. In another embodiment a batch of event messages will be dequeued and then processed one at a time (e.g. after being deduped, sorted by event type, and sorted by user role level). The source data and target data are retrieved based on the queue message being processed. The dimension values of the queue/event message, source data, and target data are compared with each other. Target data is then updated based on the comparison and rollups of the target data are performed. The comparison results in five cases:

In one case of the comparison, the dimension values for the queue message, source data and target data all match each other (e.g. when the user modifies only measure data). In such a case, only the target's measure data (e.g. revenue) is updated and aggregated into forecast rollups.

In case 2 of the comparison, the dimension values of the source do not match that of the queue but the queue's dimension values match that of the target data. This can happen where the source's dimensions have already changed by the time the queue message is processed, but the queue message still matches the target. When this happens, the target's measure value is set to zero and aggregated into forecast rollups.

In case 3, the dimension values of the source matches that of the queue but not that of the target data. In this case, the target's measure value is checked. If it is zero, both the dimension and measure data are updated for the target. The updated target data is then aggregated into forecast rollups. If on the other hand the target's measure data was found to be not zero then all other messages in the queue for a particular batch are processed and then the target's measure value is checked once more. If it is zero then the target's dimension and measure data are updated and aggregated into forecast rollups. In the rare case where the target's measure value is not found to be zero, even after the batch processing has processed all events in the batch, two messages are re-enqueued—one having the source's dimension values and the other having the target's dimension values In case 4, the dimension values of the source matches that of the target but not that of the queue. In this case, the target data should not be and cannot be modified because no lock would have been acquired for it.

In case 5 of the comparison, the dimension values of the queue message, source data, and target data all do not match each other. In this case also, the target data should not be and cannot be modified because no lock would have been acquired for it.

In one embodiment, 10+1 dimensions are used, although it will be apparent that any number of dimensions may be used. In certain aspects, the dimensions include named dimensions: org, period, forecast type, user, territory; generic dimensions 1-5; and category id, the "+1 dimension". In one embodiment, a composite dimension key is used: the first 10 dimensions are assigned a single key, because they are used everywhere and it is desirable to speed up and simplify joins. Category is left out of the composite key as category has very special behavior: non-hierarchical aggregation. In certain aspects, there are 2 kinds of categories: basic categories, which are independent of one another, and aggregated categories, which are an aggregate of basic categories. A basic category can map to multiple aggregated categories. A forecast contains several forecast items each with a different category id. So a forecast can be accessed by composite id and a forecast item can be accessed by composite id+category id.

In one embodiment, a dimension converter is provided. In certain aspects, the dimension converter decouples the entity world (e.g. opportunities and line items) from the dimension world. In the dimension world, only dimensions and fact values are important. Also, anything can be forecasted: any attribute can be extracted from any entity into fact values and perform rollups and overrides.

Override handling is much easier under this architecture as large queries and complex functions are not needed to perform value replacement. In this new module, simple switching logic is used to calculate f3 and f4. (See, e.g., FIG. 5). Also, it is much easier to change rollup logic: as long as one can describe the override logic in a math formula, one can easily support any new behavior.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF THE INVENTION

The present invention provides systems and methods for providing forecasts using data in an on-demand database and/or application service.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query or query plan refers to a set of steps used to access information in a database system.

System Overview

Figure 1:
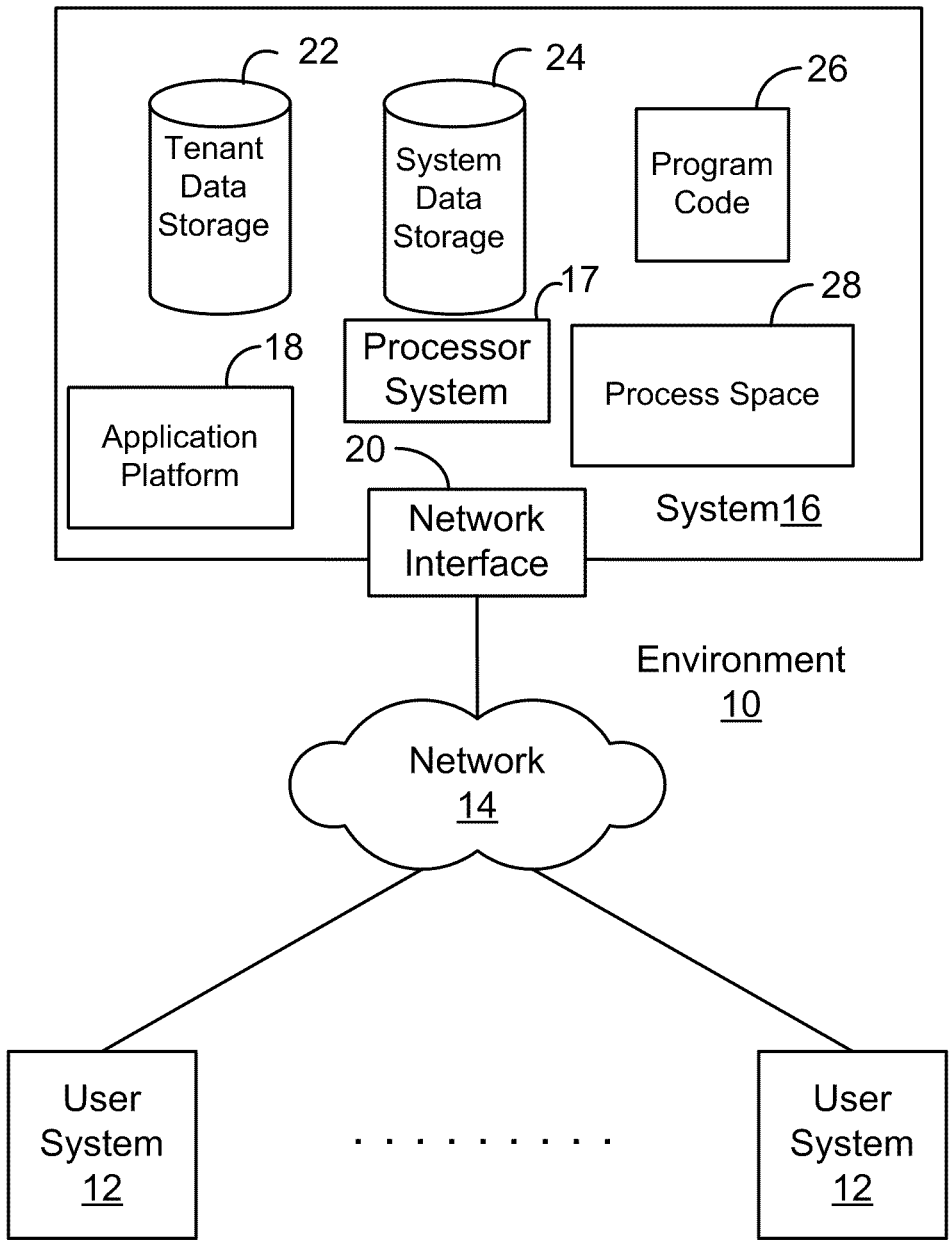
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
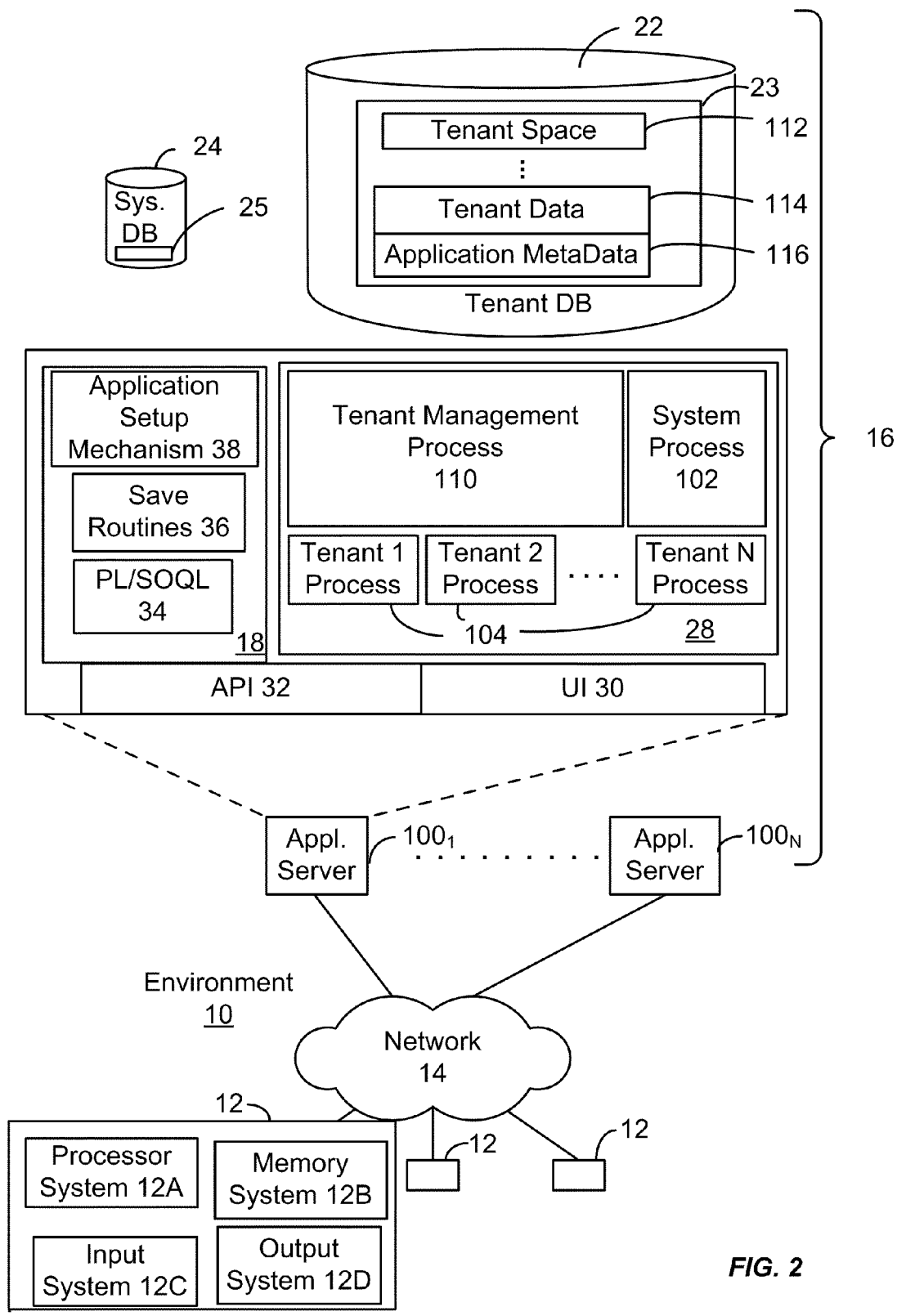
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Forecasting

According to one embodiment, forecasting systems and methods are provided within the context of an MTS or other database system. A forecast can be, for example, the aggregation of a numeric value of the source data, that is then aggregated up a user role hierarchy, layer by layer as a rollup along its dimensions. Measures are quantitative attributes that are aggregated to create forecast totals (e.g. revenue or quantity). Dimensions are qualitative attributes that are used to qualify and slice forecast numbers (e.g. a period of time, an owner, a product).

In certain embodiments, methods and systems for generating forecasts (e.g. aggregated numbers such as the sum of a sales person's opportunity data) are provided. A forecast is based on a multi-dimensional analysis of source data (e.g. containing a numeric value—typically data from objects such as opportunities, opportunity products, or opportunity schedules). Most of the source data's dimensions are typically small, and their rollup logic is simple (e.g. periods). As a result, rollup can be performed on demand like a report when the forecast is viewed (e.g. aggregating months into quarters). The user/role dimension is often different however; it is typically large, and its rollup logic is complex (e.g. a user can override a subordinate's forecast). As such, it is often impractically slow to aggregate when the forecast is viewed. Instead, in one embodiment, the source data is aggregated up the user/role dimension and stored when the source data changes.

Asynchronous Process

In certain aspects, methods and systems for generating forecast numbers are provided. When a user changes source data (e.g. updates an opportunity), it is desirable to synchronize those changes to the target data (e.g. fact table number) and forecast rollup numbers asynchronously. Doing this asynchronously advantageously allows complex data transformations on the target data (e.g. rollups, summarizations, conversions) to be performed at a time of choosing when suitable system resources are available, rather than holding up the user's change to wait for those resources to become available. This avoids contention.

According to certain aspects, forecast numbers are calculated layer by layer, and entity and dimension worlds are decoupled. This allows for small, simple queries instead of giant queries, and it avoids a lot of intermediate tables and reduce data inconsistency risk. Additionally, far fewer resources are used, direct reports' numbers are reused layer by layer (sorting by user role layer) instead of scanning the whole sub-tree for each forecast, events are processed together while rolling up the hierarchy, e.g. for a thousand sales rep changes, the top (e.g., CEO) is updated only once (event deduping).

In one embodiment, improved methods and systems are provided for asynchronously updating forecast rollup numbers, making them available for viewing in near real-time. The asynchronousity is achieved by decoupling the source data change (e.g. a sales person updates her opportunity data) from further manipulations of the source data. One example of further manipulations is updates to target data (e.g. a copy of the source data, having a one-to-one relationship with the source data, maintained separately to decouple front-end users updating opportunity data from back-end processing that will use that source opportunity data for forecast rollups). Another example is the updating of forecast rollup numbers themselves.

The asynchronous processing can be done in a single transaction or multiple transactions. It can be order independent, messages can be processed differently from the order in which the underlying event occurred.

Data Structures

Figure 3:
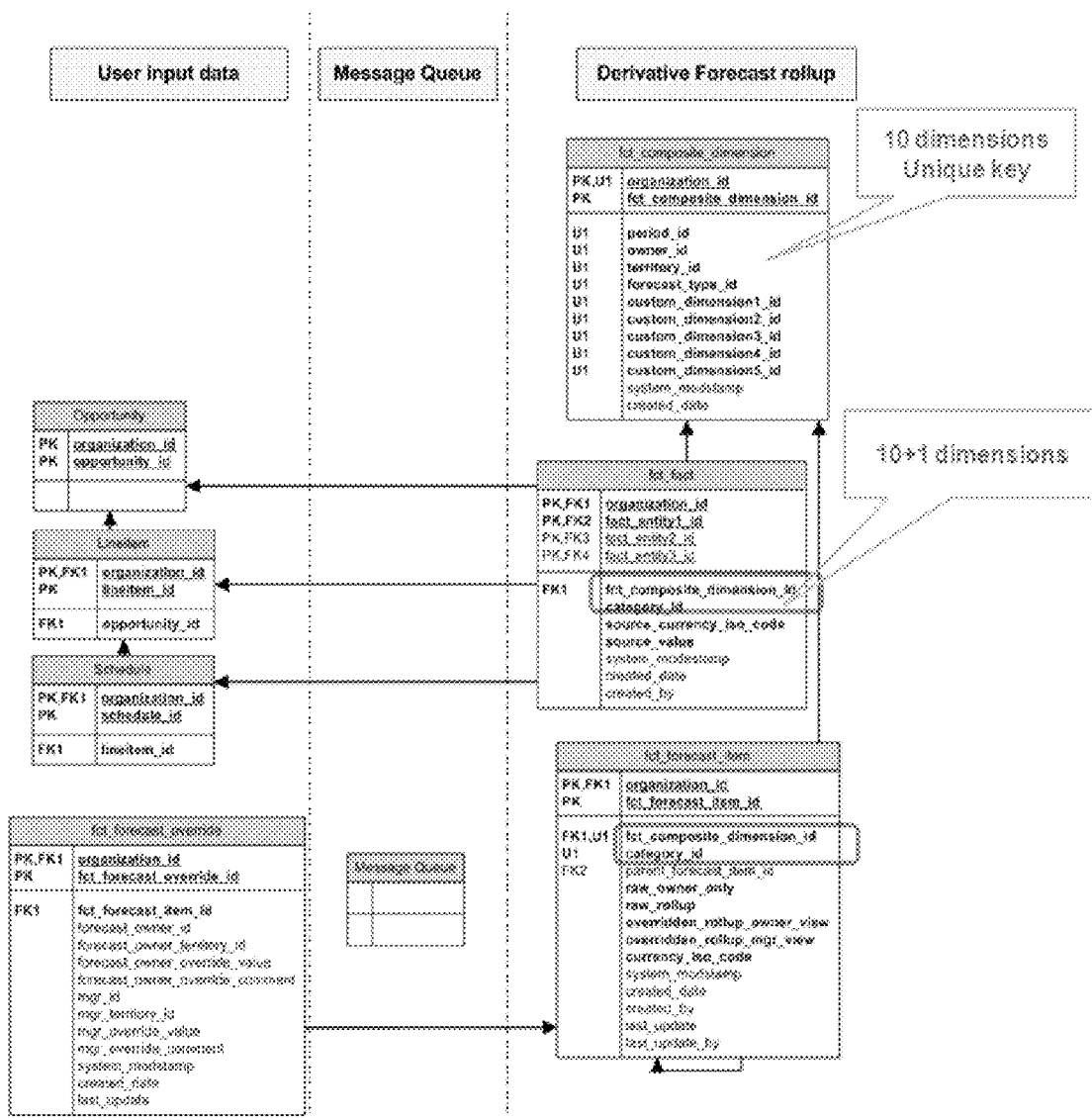
FIG. 3 illustrates a database (DB) architecture for aggregation, according to one embodiment.

FIG. 3 illustrates a database (DB) design in one embodiment for forecast rollups that is advantageously fast, scalable, simple, extensible, maintainable and accurate. Source data updates take place on the opportunity table. A source update will be applied to the opportunity table. Override updates takes place on the fct_forecast_override table. Forecast numbers reside in the fct_forecast_item table. An intermediate processing table, fct_fact table, maintains a copy of the source opportunity data (to decouple the source data update from later manipulations of source data—as in forecast rollup logic). The dimensions correlating to any particular forecast are defined in the fct_composite_dimension table and allows for 5 custom dimension specifications.

Later event processing for forecast rollups updates the fct_fact or target table and updates forecast numbers on the fct_forecast_item table. Also, rollups are performed on the fct_forecast_item table by grabbing all rows for subordinates of the rollup layer being processed and aggregating all the values of the subordinates and applying them to the row being processed. Similarly, override updates are applied to the fct_forecast_item table when overrides are updated.

Queue Implementation

Figure 11:
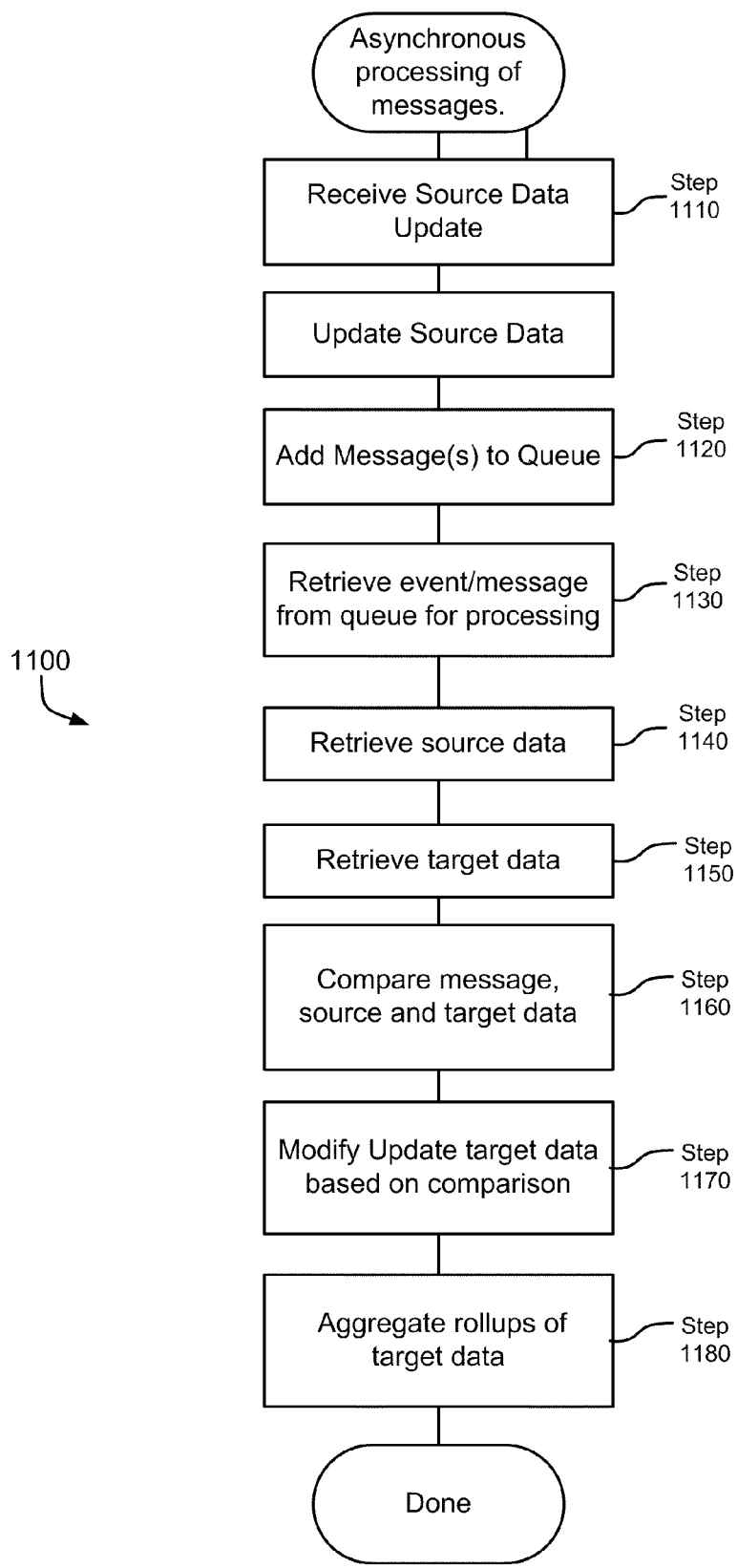
FIG. 11 illustrates one embodiment of asynchronous processing of messages, from the receiving of a source data update to target data update and forecast rollups.

In certain aspects, the asynchronous system uses an event message queue implementation. FIG. 11 illustrates the steps of an event message queue processing method 1100 in one embodiment. In step 1110, a source data update is received, e.g., when a user changes source data or forecast override data. Based on the source data update in step 1120 the system adds one or more event messages to a queue for later forecast rollup processing by an asynchronous process. In step 1130, the asynchronous process dequeues a batch of event messages and processes the batch of events to update forecast rollup numbers according to steps 1140-1180. As an example batch size can range from 1 to 100 or even greater. The batch size can be configurable. The queue can be single threaded or multi-threaded. In steps 1140 and 1150, the source data and target data are retrieved based on the queue message being processed. The dimension values of the queue message, source data, and target data are compared with each other in step 1160. Target data is then updated based on the comparison and rollups of the target data are performed, steps 1170 and 1180.

In one embodiment, the batch processing is implemented and made more efficient by first deduping the events, then sorting the events by event type, then sorting the events by user role layer, after which the remaining events are processed. The deduping step removes any duplicate events (e.g. if there are three forecast rollup events for a manager VP1, two of them will be removed leaving only one forecast rollup event for VP1). The sorting by event type results in for example, three categories of events: entity event, override event, and rollup event. And the sorting by user role level for example can result in categories of events for User1, his manger VP1, and the head of the company CEO.

In certain aspects, there are at least three different event types: entity change event, override event, and rollup event. An entity change event is created, for example, when a user updates base level data or source data (e.g. a sales person updates his opportunity data). In one embodiment, the entity change event will contain information that identifies the source data object and the impacted forecast data object.

An override event is created, for example, when a user updates forecast override data. In one embodiment, the associated event will contain the identifier for the override or the impacted forecast data object. And the rollup event, for example, specifies the aggregation for a forecast number at a particular user or user role level is required (e.g. a rollup for manager VP1). In one embodiment, the rollup event will contain information identifying which forecast data needs to be aggregated or rolled up.

In one embodiment, the processing of events in the batch processing step is done by first processing all entity type events, one at a time. Then, all override events are processed one at a time, after which the rollup events are processed, one at a time, user role layer-by-layer (e.g. first process rollup event for manager VP1, then process rollup event for the CEO).

In one embodiment, the batch is processed by processing the events one by one. Upon the processing of an event, its associated source, target and forecast data is retrieved. Once the data is retrieved, the delta between the source and target is computed (e.g. the difference in the opportunity value such as $10,000 is changed to $20,000—resulting in a delta computation of plus $10,000). The target data is updated with the source data and the delta is applied to forecast data (e.g. the sales person who modified the opportunity will have his forecast number increased by $10,000). The delta is then rolled up by user role layer by layer (e.g. the $10,000 increase in opportunity data is added to the sales person's immediate manager, and rolled up to the territorial manager and then to the CEO of the company).

In certain aspects, an event is processed one at a time by obtaining a lock on forecast data based on the event being processed, obtaining a lock on target data based on the event being processed; re-queuing the event being processed where a lock could not be obtained, otherwise updating target data and forecast data; and adding a rollup event to the event queue where a user role layer above the current processing layer exists and where the event is not a duplicate of another event in the batch being processed.

For example, when an event representing a user's update to his opportunity data from $10,000 to $20,000 is being processed an attempt is made to obtain a lock on the corresponding forecast data object for that user (e.g. a lock for User1's forecast item). If that is successful an attempt is made to obtain a lock on the corresponding target or fact data object (e.g. a lock for User1's fact object corresponding to the opportunity that is updated). If either lock is not obtained then the event is requeued otherwise processing of forecast rollups continues.

Figure 12:
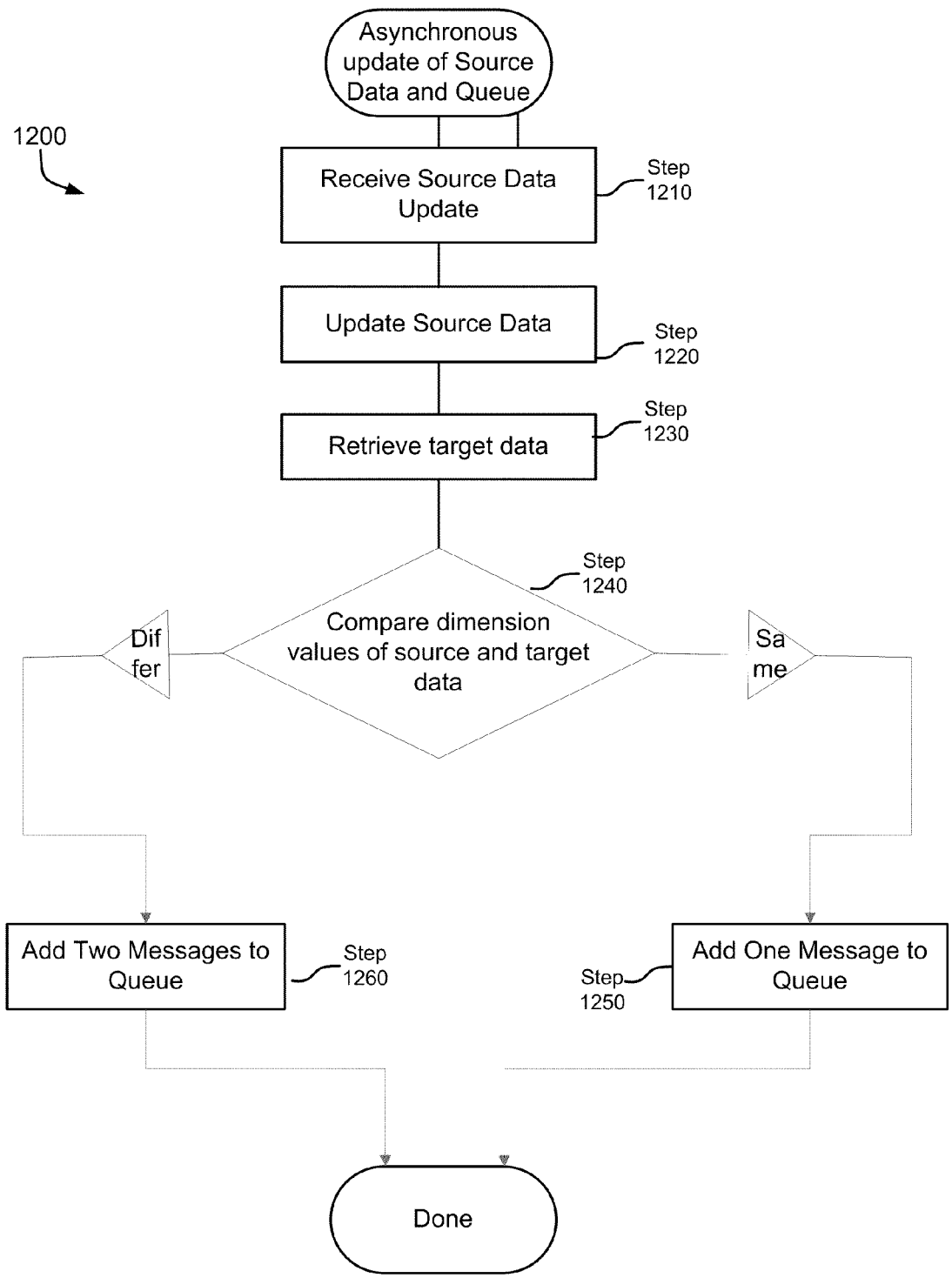
FIG. 12 illustrates one embodiment of message queue processing, from the receiving of a source data update to the adding of message(s) to a queue.

In one embodiment, a specific queue implementation might include:
   Use Message Queue
   Single thread per org
   Enqueue only the base level events (e.g. an opportunity insert enqueues a single rep level event)
   Bulk dequeue but rollup to the CEO within a single transaction
   Priority queue, with priority determined by user role level
Another specific implementation might include:
   Use Message Queue
   Multiple threads per org
   Enqueue only the base level events (e.g. an opportunity insert enqueues a single rep level event)
   Bulk dequeue rolls up just a single level, and then requeues its parents
   Lock forecast item id (or forecast_id) upon dequeue to avoid contention
   FIFO queue Queue Implementation—Event Message Management FIG. 12 illustrates a queue message implementation according to one embodiment. In step 1210, a source data update is received, e.g., when a user alters source data. In step 1220 the received data update is applied to the source data by updating, for example, the corresponding data row in a database table. Then in step 1230 the target data row corresponding to the source data update is retrieved in order to compare the dimension values of source and target data, as specified in step 1240. If they are the same (e.g. the user has changed only source measure data such as opportunity), one message is pushed on the queue containing the dimension data (note no measure data information is required), in step 1250. If on the other hand they differ (e.g. the user has altered source dimension data) two messages are pushed on the queue in step 1260, the first having the target's dimensions and the second having the source's dimensions (note once again no measure data information is required on either message).

One example of queue implementation is as follows: consider an opportunity that belongs to composite dimension A==>opp table: A. fact table: A. forecast item table: A
Step 1: Update opp1 from A to B==>opp table: B. fact table: A. forecast item table: A
   We will have a queue like this:
   (A, opp1)
   (B, opp1)
Step 2: Update opp1 from B to C==>opp table: C. fact table: A. forecast item table: A
   We will have a queue like this:
   (A, opp1)
   (B, opp1)
   (A, opp1)==>Why not B? Because opp1 belongs to A in the fact table.
   (C, opp1)
Step 3: Async process kicks in
   Now: Opp table is (C, opp1) and Fact table is (A, opp1)
   Async process will only process (A, opp1) then (C, opp1) events and ignore (B, opp1), which does not impact any forecast items.
Queue corner case: in the above example, there is an interesting situation:
   Step 1 . . . (as above)
   Step 2 . . . (as above)
   Step 3: Async process kicks in
   Now: Opp table is (C, opp1) and Fact table is (A, opp1).

However, forecast item A is locked, say, so the event (A, opp1) can't dequeue yet.
   Again we ignore the (B, opp1) event.
   Async process tries to process (C, opp1) but notices that the existing fact value in A is not zero. It re-enqueues:
   (A, opp1)
   (C, opp1)
Queue corner case: in the above example, there is another interesting situation:
   Step 1 . . . (as above)
   Step 1.5 (Between step 1 and 2) The async process kicks in and starts to process events (A, opp1) (B, opp1) and update the fact table. It has not committed yet.
   Step 2: because the async process has not committed its change to the fact table, front end will still enqueue as follows:
   (A, opp1)
   (B, opp1)
   (A, opp1)
   (C, opp1)
   Step 2.5: the async process commits its transaction. Now we will have out of sync problem:
   Opp table: (C, opp1)
   Fact table: (B, opp1)
   Queue: (A, opp1) and (C, opp1)
   Step 3: This can be easily solved by re-enqueue. When async process kicks in again
   (A, opp1) event==>ignore. Because opp table is (C, opp1) and Fact table is (B, opp1)
   (C, opp1) event==>Because opp table is (C, opp1) and Fact table is (B, opp1), but value is not zero. re-enqueue
   (B, opp1)
   (C, opp1)

Data Flow

Figure 4:
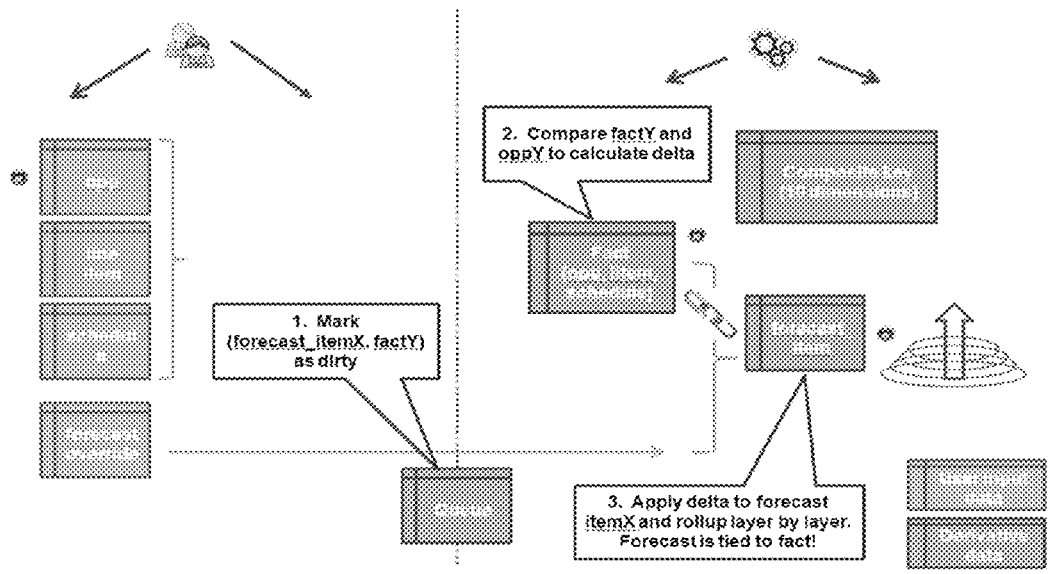
FIG. 4 illustrates a data flow according to one embodiment.

FIG. 4 illustrates a data flow according to one embodiment. After an object (e.g., an opportunity object or "opp") is inserted, the fact and impacted forecast item are marked as dirty. This indicates that the marked fact and forecast items need to be updated with the newly received opportunity data. A dimension converter transforms the opp into a fact object, by for example generating a period id by, e.g., opportunity close date (via a lookup on the period table) and a composite dimension id by 10 opp attributes (via a lookup on fct_composite_dimension table). After this, a fact row is added to fct_fact table with "0" value. This is done because the later asynchronous process will collect the value and apply it to the fact table and forecast item table. The processing continues by retrieving the impacted forecast item id and enqueuing 1 fact-change event (new fct_item_id, oppid) onto the queue. In other embodiments the change event message also includes other identifiers such as orgid.

Similarly, after an opp is updated, the original fact and forecast item are marked as dirty. This is done by retrieving the original fact row by opp id and original impacted fct_forecast_item by the original fact. Next a fact-change event is enqueued (original fct_item_id, oppid).

The new fact and forecast item are also marked as dirty (by enqueuing 1 fact-change event with the associated fct_item_id and oppid) when the source and fact (or target) dimensions are different.
   Convert the new updated opp into a fact object
   Find the new impacted forecast item by the new fact
   Enqueue 1 fact-change event (new fct_item_id, oppid)

In one embodiment, the asynchronous process, not the front end, maintains the fact table in one embodiment. In this embodiment, a delta table is no longer needed; the delta is calculated by comparing opportunity and fact records, and the delta is applied directly to forecast items. The relationship between fct_fact and fct_item (or fct_forecast_item) includes forecast items are calculated based on fct_fact, and they are always in sync. Forecast items are a rollup of facts (with exceptions for overrides). In certain aspects, whenever there is a difference between the opportunity and fact records, the delta is calculated and applied to the forecast items, and the fact table is updated to keep it up-to-date. This advantageously solves the data consistency problem when setup events take a long time to populate the fact table, and front end users update opportunities at the same time.

As an example, consider the following: the asynchronous process is populating opp1 to opp100 from opp table to fact table and a user is updating opp1 at the same time. If the async process were to lock opp1-100 to ensure data consistency, end users would complain that they cannot update opportunities. If the async process does not lock opp1-100, so users can update these opportunities at the same time, then there is no guarantee what kinds of values one will get. one might get the old value of opp1 but the new value of opp2, depending on the sequence. According to one aspect, a way to solve this problem is that the async process does not lock opportunities while it populates the fact table. When a user updates opp1 at the same time, opp1 is placed in the event queue. When the async process finishes opp1-100 populating, it will process the opp1 event. It will compare opp1 and the row in the fact table. If there is no difference, then it does nothing. If there is a difference, then it calculates the delta, applies the delta to the forecast item, and updates the fact table. This completely avoids the delta table access, which advantageously saves resources.

The fct_item is used to lock the forecast item. If the lock cannot be obtained, then the event is re-enqueued. The opp id shows which opportunity needs to be checked for changes. The fct_item id shows which forecast item needs to be recalculated In one prior engine, the old value needs to be subtracted before opp update and add new value after opp update; it can be difficult for other modules to deal with these forecast paired calls. In the present engine, it is not needed to know the old value of the opportunity; only the original value in the fact table and the new value in the opportunity table are needed. Additionally, in the prior engine, a transaction observer is used to ensure that all original values are subtracted before update and new values are added before commit, and partial failure cases are handled. In the present engine, no transaction observer is needed to guarantee the paired calls, as discussed above. Also, in the partial failure case, we might enqueue an opp change that has been rolled back. However, the async process just compares the fact and opp. If it detects no change, it just ignores the event.

In one embodiment, an asynchronous process flow is as follows: A process dequeues the events in bulk, locking forecast_items, retrieves opportunities by opportunity id and transforms them into fact objects, compares fact objects in memory with the rows in the fact table to decide delta values, updates the fact table, applies deltas to fct_item.f1, sorts all fct_items by role hierarchy layer (i.e. process sales reps first and the CEO last), and calculates f2, f3, and f4, processing from the lowest layer of the role hierarchy upwards (see, e.g., FIG. 5). These forecast values are stored in the raw_rollup, overridden_rollup_owner_view, and overridden_rollup_mgr_view respectively. The raw_owner_only stores the f1 value, representing the user's own opportunity aggregate or forecast data.

Dimensions

In one embodiment, 10+1 dimensions are used, although it will be apparent that any number of dimensions may be used. In certain aspects, the dimensions include named dimensions: org, period, forecast type, user, territory; generic dimensions 1-5; and category id, the "+1 dimension". In one embodiment, a composite dimension key is used: the first 10 dimensions are assigned a single key, because they are used everywhere and it is desirable to speed up and simplify joins. Category is left out of the composite key as category a has very special behavior: non-hierarchical aggregation. In certain aspects, there are 2 kinds of categories: basic categories, which are independent of one another, and aggregated categories, which are an aggregate of basic categories. A basic category can map to multiple aggregated categories. A forecast contains several forecast items each with a different category id. So a forecast can be accessed by composite id and a forecast item can be accessed by composite id+category id.

In one embodiment, a dimension converter is provided. In certain aspects, the dimension converter decouples the entity world (e.g. opportunities and line items) from the dimension world. In the dimension world, only dimensions and fact values are important. Also, anything can be forecasted: any attribute can be extracted from any entity into fact values and perform rollups and overrides.

Override Handling

Override handling is easier under this architecture as large queries and complex functions are not needed to perform value replacement. In this new module, simple switching logic is used to calculate f3 and f4. (See, e.g., FIG. 5). Also, it is easier to change rollup logic: as long as one can describe the override logic in a math formula, one can easily support any new behavior.

Forecast Basic Rules: 4 Forecast Views

Figure 5:
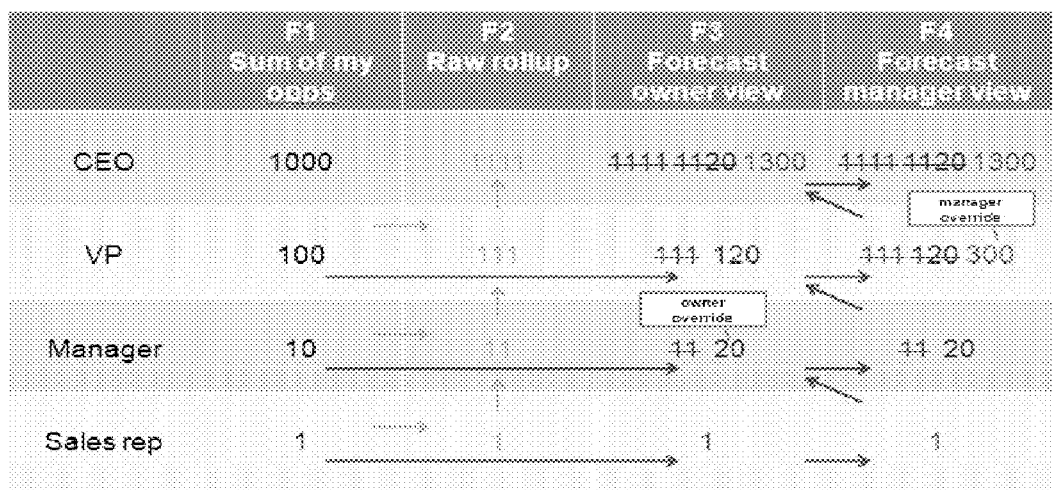
FIG. 5 illustrates four different views of forecasting data.

A forecast user is typically interested in seeing four different views of the forecasting data as shown in FIG. 5:

Sum of my opportunities (raw owner opps only)

$$f1 = \Sigma my\_opp$$

Raw rollup(no overrides)

$$f2 = f1 + \Sigma_{direct\_report} f2$$

Forecast owner view $$f3_{owner} = OwnerFctOverride \| f1_{owner} + \Sigma_{direct\_report} f4$$

Forecast manager view (rep's forecast viewed by mgr)
Without opp override $$f4 = MgrFctOverride \| f3$$

With opp override $$f4 = MgrFctOverride \| f3 + \Sigma \Delta MgrOppOverride(Not\text{-}BlockedByFctOverride)$$

Forecast Rollup Logic

In one embodiment, two different kinds of attributes on the source data are distinguished: dimensions and measures. Dimensions are qualitative attributes that are used to qualify and slice forecast numbers, e.g. a period of time, an owner, a product. Measures are quantitative attributes that are used to aggregate to create the forecast totals, e.g. revenue or quantity. For instance, one source opportunity ("Opp1") may have these attributes:

Period (dimension): July 2010
Owner (dimension): Joe Smith
Revenue (measure): $10,000

In one embodiment, data changes are communicated from source to target via messages on a queue. Each queue message holds dimension data, but no measure data (this allows for handling both a delta event and a recalculation event, without caring about the order of processing). The queue may not guarantee the order in which messages are processed, but it is often first-in-first-out, subject to system resource availability. When a user alters source data, the states of the target dimensions and the source dimensions are compared. If they are the same, e.g. the user has changed only source measure data, a single message is pushed onto the queue. If they differ, e.g. the user has altered source dimension data, two messages are pushed onto the queue in one embodiment:

The first message contains the target's dimensions,
The second message contains the source's dimensions.

In certain aspects, the asynchronous system is implemented by distinguishing between two different kinds of attributes on the source data: dimensions and measures. Dimensions are qualitative attributes (e.g. period of time, sales person, product, region) used to slice report data such as forecast numbers. Measures are quantitative attributes used to aggregate for example forecast totals (e.g. revenue or quantity).

As above, FIG. 11 illustrates the steps for processing one event message in one embodiment. In one embodiment, an event message is retrieved from a message queue for processing. In another embodiment a batch of event messages will be dequeued and then processed one at a time (e.g. after being deduped, sorted by event type, and sorted by user role level). In steps 1140 and 1150, the source data and target data are retrieved based on the queue message being processed. The dimension values of the queue message, source data, and target data are compared with each other in step 1160. Target data is then updated based on the comparison and rollups of the target data are performed, steps 1170 and 1180.

When each queue message starts to process, there may be five different cases:

In case one of the comparison, the dimension values for the queue message, source data and target data all match each other (e.g. when the user modifies only measure data). In such a case, only the target's measure data (e.g. revenue) is updated and aggregated into forecast rollups.

Figure 6:
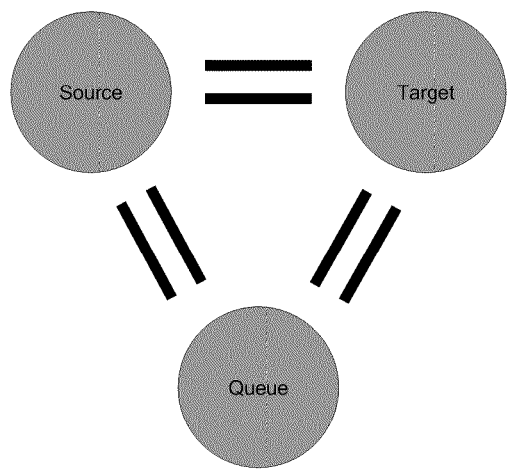
FIG. 6 illustrates Case 1, where: Source=Queue=Target.

FIG. 6 illustrates Case 1, where: Source=Queue=Target. In the simplest case, the dimensions in the queue message match those in the source and target data. For example, 1. A user alters opportunity Opp1 (above) from $10,000 revenue to $12,000.
2. A message is pushed on the queue that essentially says: "Synchronize Opp1 for July 2010 and Joe Smith." Note that it holds no measure information.
3. Some time later, as system resources align appropriately, the queue message is processed.
4. Sole access (a 'lock') is acquired to alter target data for the dimension combination from the queue message: July 2010/Joe Smith.
5. The state of the source data and the target data dimensions is checked. In this case, all 3 match—all read "July 2010/Joe Smith".
6. Only the source and target measure differs (source=$12,000, target=$10,000).
7. The target revenue for Opp1 is updated to $12,000, so that target and source now match.
8. The target data is aggregated into forecast rollups.

In case 2 of the comparison, the dimension values of the source do not match that of the queue but the queue's dimension values match that of the target data. This can happen where the source's dimensions have already changed by the time the queue message is processed, but the queue message still matches the target. When this happens, the target's measure value is set to zero and aggregated into forecast rollups.

Figure 7:
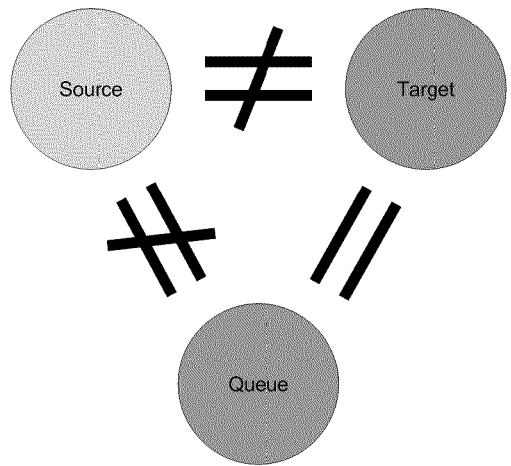
FIG. 7 illustrates Case 2, where: Source !=Queue=Target.

FIG. 7 illustrates Case 2, where: Source !=Queue=Target. In this case, the source's dimensions have already changed by the time the queue message is processed, but the queue message still matches the target. For example, 1. A user alters the opportunity Opp1 (above) from July 2010 to August 2010.
2. 2 messages are pushed on the queue:
   a. The first essentially says: "Synchronize Opp1 for July 2010 and Joe Smith."
   b. The second essentially says: "Synchronize Opp1 for August 2010 and Joe Smith." Note that neither holds measure information.
3. Some time later, as system resources align appropriately, the first queue message is processed.
4. Sole access (a 'lock') is acquired to alter target data for the dimension combination from the first queue message: July 2010/Joe Smith.
5. The state of the source data and the target data dimensions is checked. In this case, the target matches the queue message: "July 2010/Joe Smith". But the source data is different: "August 2010/Joe Smith"
6. The target revenue for Opp1 is reduced from $10,000 to zero. However, its dimension information is not changed yet.
7. The target data is aggregated into forecast rollups.

Figure 8:
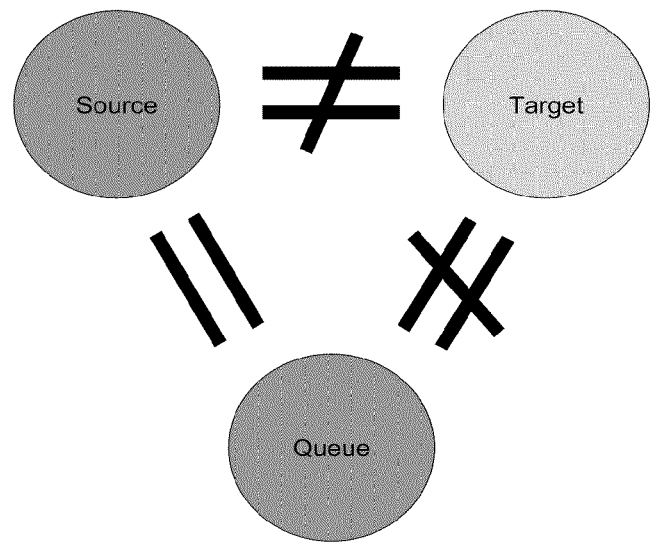
FIG. 8 illustrates Case 3, where: Source=Queue !=Target.

In case 3, the dimension values of the source matches that of the queue but not that of the target data. In this case, the target's measure value is checked. If it is zero, both the dimension and measure data are updated for the target. The updated target data is then aggregated into forecast rollups. If on the other hand the target's measure data was found to be not zero then all other messages in the queue for a particular batch are processed and then the target's measure value is checked once more. If it is zero then the target's dimension and measure data are updated and aggregated into forecast rollups. In the rare case where the target's measure value is not found to be zero, after the batch processing, two messages are re-enqueued—one having the source's dimension values and the other having the target's dimension values FIG. 8 illustrates Case 3, where: Source=Queue !=Target. In this case, the source dimensions match the queue message, but the target dimensions are stale. For example, 1. As in Case 2 above, a user alters the opportunity Opp1 (above) from July 2010 to August 2010.
2. 2 messages are pushed on the queue:
   a. The first essentially says: "Synchronize Opp1 for July 2010 and Joe Smith."
   b. The second essentially says: "Synchronize Opp1 for August 2010 and Joe Smith."
3. Some time later, as system resources align appropriately, the second queue message is processed.
4. Sole access (a 'lock') is acquired to alter target data for the dimension combination from the second queue message: August 2010/Joe Smith.
5. The state of the source data and the target data dimensions is checked. In this case, the source matches the queue message: "August 2010/Joe Smith". But the target data is different: "July 2010/Joe Smith"
6. The target's revenue is checked.
   a. If it's zero (e.g. if the first queue message has already processed as in Case 2 above), both the dimension and measure data are corrected for the target. The target is changed from July to August, and the revenue is increased from zero to $10,000, so that the target and source now match. The target data is aggregated into forecast rollups.

b. If it's not zero (e.g. if the first queue message has not already processed yet) all other messages in this batch of messages are processed and then step 6 is repeated again in case the first message is further downstream in the same batch. If it's still not zero, the target data cannot be touched as no lock is held for July 2010/Joe Smith. In this rare case, two messages are re-enqueued: one for July 2010/Joe Smith, and one for August 2010/Joe Smith.

In case 4, the dimension values of the source matches that of the target but not that of the queue. In this case, the target data should not be and cannot be modified because no lock would have been acquired for it.

Figure 9:
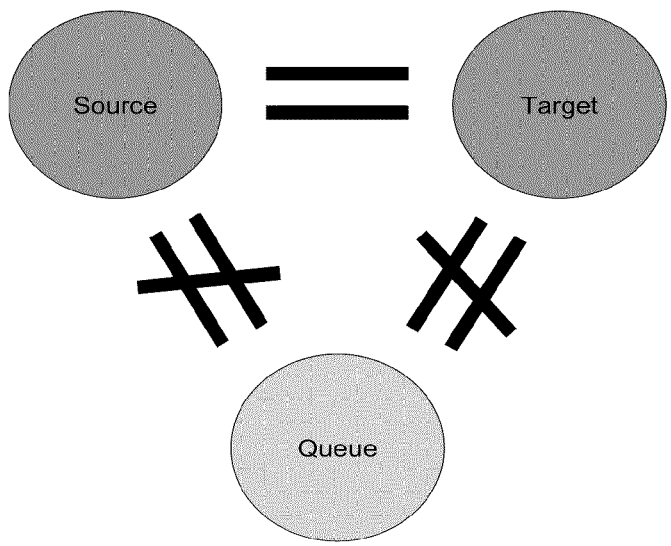
FIG. 9 illustrates Case 4, where: Source=Target !=Queue.

FIG. 9 illustrates Case 4, where: Source=Target !=Queue. In this case, the source dimensions match the target, but the queue message is different. For example, 1. A user alters the opportunity Opp1 (above) from July 2010 to August 2010.
2. 2 messages are pushed on the queue:
    a. The first essentially says: "Synchronize Opp1 for July 2010 and Joe Smith."
    b. The second essentially says: "Synchronize Opp1 for August 2010 and Joe Smith."
3. Before any messages are processed, the user alters Opp1 back from August 2010 to July 2010.
4. Both source and target now point to July 2010, so 1 more message is pushed on the queue:
    a. It essentially says "Synchronize Opp1 for July 2010 and Joe Smith."
5. Some time later, as system resources align appropriately, the second queue message is processed. (It doesn't make much difference whether the first and third messages have processed yet.)
6. Sole access (a 'lock') is acquired to alter target data for the dimension combination from the first queue message: August 2010/Joe Smith.
7. The state of the source data and the target data dimensions is checked. In this case, the target matches the source: "July 2010/Joe Smith". But, the queue message is different: "August 2010/Joe Smith"
8. The target data cannot be touched as there is no lock held for July 2010/Joe Smith There are no changes that need to be made to the target data.

In case 5 of the comparison, the dimension values of the queue message, source data, and target data all do not match each other. In this case also, the target data should not be and cannot be modified because no lock would have been acquired for it.

Figure 10:
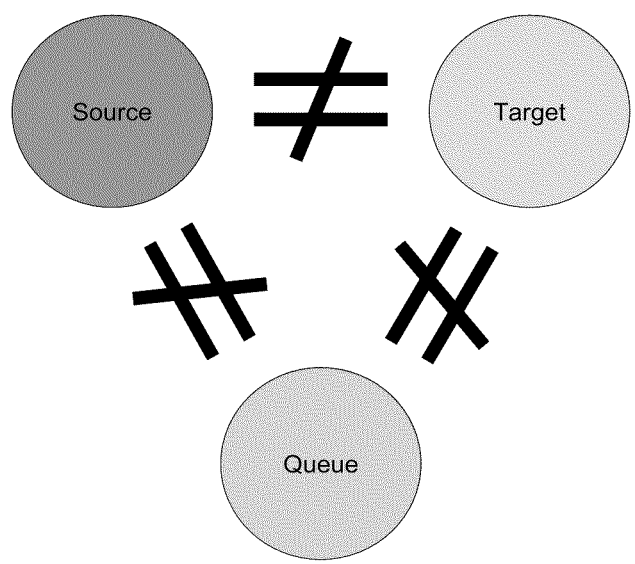
FIG. 10 illustrates Case 5, where: Source !=Queue !=Target.

FIG. 10 illustrates Case 5, where: Source !=Queue !=Target. In this case, all three sets of dimensions are different. For example, 1. A user alters the opportunity Opp1 (above) from July 2010 to August 2010.
2. 2 messages are pushed on the queue:
    a. The first essentially says: "Synchronize Opp1 for July 2010 and Joe Smith."
    b. The second essentially says: "Synchronize Opp1 for August 2010 and Joe Smith."
3. Before any messages are processed, the user alters Opp1 from August 2010 to September 2010.
4. 2 messages are pushed on the queue:
    a. The first essentially says: "Synchronize Opp1 for July 2010 and Joe Smith."
    b. The second essentially says: "Synchronize Opp1 for September 2010 and Joe Smith."
5. Some time later, as system resources align appropriately, the second queue message is processed. (It doesn't make much difference whether the first message has processed yet.)
6. Sole access (a 'lock') is acquired to alter target data for the dimension combination from the first queue message: August 2010/Joe Smith.
7. The state of the source data and the target data dimensions is checked. In this case, none of them matches: the source is "September 2010/Joe Smith" and the target is "July 2010/Joe Smith"
8. The target data cannot be touched as no lock is held for July 2010/Joe Smith. There are no changes to be made to the target data. The other queue messages will update the target data appropriately.

Appendix A describes additional features and aspects of event handling according to certain embodiments.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of asynchronously updating forecast rollup numbers:
    receiving, by a processor system, a data update, including a source data or an override data update;
    adding, by the processor system, one or more events to an event queue based on the data update;
    dequeuing, by the processor system, a batch of one or more events from the event queue; and
    processing, by the processor system, the batch of events to update forecast rollup numbers, the processing including:
        retrieving one or more source data based on the batch of events being processed,
        retrieving one or more target data based on the batch of events being processed, each target data being associated with a corresponding source data,
        determining differences in value between each target data and the corresponding source data,
        updating each target data based on the corresponding difference in value,
        retrieving forecast data based on the batch of events being processed,
        aggregating the differences in value associated with users at a first level of an organizational hierarchy to provide a first aggregated data, and
        summing the first aggregated data with forecast data corresponding to a user at a second level of the organizational hierarchy to provide a second aggregated data, the second level being at a higher level of the organizational hierarchy than the first level.

2. The method of claim 1 wherein the step of batch processing of events includes: deduping the events; sorting the events by event type; and sorting the events by user role layer.

3. The method of claim 2 wherein the event type includes at least two of the following event types: entity event, entity event being either an insert or an update to source data; override event, override event being either an insert or an update to forecast override data; and rollup event, a rollup event being one that computes a forecast rollup.

4. The method of claim 3 wherein the processing of events includes: processing all entity type events, one at a time;

processing all override events, one at a time; processing all rollup events, one at a time, layer-by-layer.

5. The method of claim 1 wherein the processing of events includes: processing the events one at a time; obtaining a lock on forecast data based on the event being processed; obtaining a lock on target data based on the event being processed; re-queuing the event being processed where a lock could not be obtained; otherwise updating target data and forecast data; and adding a rollup event to the event queue where a user role layer above the current processing layer exists and where the event is not a duplicate of another event in the batch being processed.

6. The method of claim 5 wherein the step of updating includes: retrieving a source data object based on the event being processed; comparing one or more dimension values of the event being processed, source data, and target data; updating the target data with the source data based on the comparison; and updating forecast data based on the comparison.

7. The method of claim 6 wherein measure value of the target data is updated with the measure value of the source data, where the event, source, and target dimension value all match each other.

8. The method of claim 6 wherein the measure value of the target data is updated to zero where the event and target dimension value match but the event and source dimension value do not match.

9. The method of claim 6 wherein measure and dimension values of the target data are updated, when the source and event dimension value match, but the event and target dimension value do not match, and the target measure values are zero.

10. The method of claim 6 wherein no update is required to the target data when dimension value of the source and target data match but dimension value of the target and event do not match.

11. The method of claim 6 wherein no update is required to the target data where dimension value of the event, source, and target data do not match each other.

12. The method of claim 1 further comprising: adding one event to the event queue where a user has updated only the measure values of the source data; and adding two events to the event queue where a user has updated both dimension and measure values of the source data.

13. The method of claim 12 wherein the event added to the queue includes a forecast data identifier and source data identifier.

14. A non-transitory computer-readable storage medium that stores code, which when executed by a processor, causes the processor to:
receive a data update, including a source data or an override data update;
add one or more events to an event queue based on the data update;
dequeue a batch of one or more events from the event queue; and
process the batch of events to update forecast rollup numbers, the process causing the processor to:
retrieve one or more source data based on the batch of events being processed,
retrieve one or more target data based on the batch of events being processed, each target data being associated with a corresponding source data,
determine differences in value between each target data and the corresponding source data,
update each target data based on the corresponding difference in value,
retrieve forecast data based on the batch of events being processed,
aggregate the differences in value associated with users at a first level of an organizational hierarchy to provide a first aggregated data, and
sum the first aggregated data with forecast data corresponding to a user at a second level of the organizational hierarchy to provide a second aggregated data, the second level being at a higher level of the organizational hierarchy than the first level.

15. The non-transitory computer-readable storage medium claim 14 wherein the storage medium consists of two or more storage units.

16. A database system that asynchronously updates forecast rollup numbers, the system comprising:
a database configured to store source data or override data, target data, and forecast data; and
a processor configured to:
receive a data update, including a source data or an override data update;
add one or more events to an event queue based on the data update;
dequeue a batch of one or more events from the event queue, and
process the batch of events to update forecast rollup numbers, the process including the processor configured to:
retrieve one or more source data based on the batch of events being processed,
retrieve one or more target data based on the batch of events being processed, each target data being associated with a corresponding source data,
determine differences in value between each target data and the corresponding source data,
update each target data based on the corresponding difference in value,
retrieve forecast data based on the batch of events being processed,
aggregate the differences in value associated with users at a first level of an organizational hierarchy to provide a first aggregated data, and
sum the first aggregated data with forecast data corresponding to a user at a second level of the organizational hierarchy to provide a second aggregated data, the second level being at a higher level of the organizational hierarchy than the first level.

17. The system of claim 16, wherein the processor is implemented in a computer system coupled with the database.

* * * * *